(12) United States Patent
Büttner et al.

(10) Patent No.: US 8,539,782 B2
(45) Date of Patent: Sep. 24, 2013

(54) METHOD FOR CONTROLLING THE POWER OF A SORPTION REFRIGERATION SYSTEM AND DEVICE THEREFOR

(75) Inventors: Thomas Büttner, Leipzig (DE); Walter Mittelbach, Freiburg (DE)

(73) Assignee: SorTech AG, Halle/Saale (DE)

( * ) Notice: Subject to any disclaimer, the term of this patent is extended or adjusted under 35 U.S.C. 154(b) by 455 days.

(21) Appl. No.: 12/735,159

(22) PCT Filed: Nov. 19, 2008

(86) PCT No.: PCT/EP2008/065822
§ 371 (c)(1),
(2), (4) Date: Sep. 15, 2010

(87) PCT Pub. No.: WO2009/080415
PCT Pub. Date: Jul. 2, 2009

(65) Prior Publication Data
US 2011/0005246 A1      Jan. 13, 2011

(30) Foreign Application Priority Data
Dec. 20, 2007   (DE) .......................... 10 2007 061 551

(51) Int. Cl.
F25B 15/00    (2006.01)
F25B 17/00    (2006.01)
B01D 46/46    (2006.01)

(52) U.S. Cl.
USPC .................. 62/112; 62/101; 62/102; 62/103; 62/106; 62/141; 62/476; 95/14; 95/15; 95/16; 95/17; 95/18

(58) Field of Classification Search
USPC .................. 62/112, 101, 102, 103, 106, 141, 62/476, 481, 480, 424.2; 95/14–18
See application file for complete search history.

(56) References Cited

U.S. PATENT DOCUMENTS 4,548,046 A    10/1985   Brandon et al. .................. 62/79
4,773,472 A *  9/1988    Aoki et al. ..................... 165/206

(Continued)

FOREIGN PATENT DOCUMENTS

DE   10062174    6/2001
EP   0731324     9/1996

(Continued)

OTHER PUBLICATIONS

Notification of Transmittal of Translation of the International Preliminary Report on Patentability; the International Preliminary Report on Patentability (in English) and the Written Opinion of the International Search Authority (in English) mailed Aug. 12, 2010.

(Continued)

*Primary Examiner* — Frantz Jules
*Assistant Examiner* — Erik Mendoza-Wilkenfel
(74) *Attorney, Agent, or Firm* — Gerald T. Bodner (57) ABSTRACT

The invention relates to a method for controlling the power of a sorption refrigeration system, comprising an adsorber unit, a condenser (C), and an evaporator (E) through which a cooling carrier fluid (KT) flows, with alternating application of the adsorber unit by a valve unit (HV_IN, HV_OUT) operated via a controller, having a circuit process of at least one sorption phase and at least one heat recovery phase, wherein a measurement of a current cooling carrier outlet temperature ($T_{akt}$) is carried out in the return of the evaporator, a calculation of an averaged cooling carrier outlet temperature ($T_{gem}$) is carried out during the first and second sorption phases with a comparison to the current cooling carrier outlet temperature ($T_{akt}$), and a control signal is trigger upon completion of the sorption phase as a function of the difference between the averaged cooling carrier outlet temperature ($T_{gem}$) and the current cooling carrier outlet temperature ($T_{gem}$). The invention provides a corresponding device.

11 Claims, 5 Drawing Sheets

(56) References Cited

U.S. PATENT DOCUMENTS

| | | | |
|---|---|---|---|
| 5,732,569 A * | 3/1998 | Sanada et al. | 62/481 |
| 6,474,099 B2 | 11/2002 | Tanaka et al. | 62/480 |
| 2004/0089001 A1 * | 5/2004 | Kakiuchi et al. | 62/112 |
| 2004/0167750 A1 * | 8/2004 | Pagnano et al. | 702/189 |

FOREIGN PATENT DOCUMENTS

| | | |
|---|---|---|
| JP | 3-7859 | 1/1991 |
| JP | 3007859 A * | 1/1991 |
| JP | 7-253257 | 10/1995 |
| WO | WO88/02089 | 3/1988 |

OTHER PUBLICATIONS

International Search Report (In English), International Preliminary Report on Patentability (In German).

* cited by examiner

METHOD FOR CONTROLLING THE POWER OF A SORPTION REFRIGERATION SYSTEM AND DEVICE THEREFOR

The invention relates to a method for controlling the capacity of a sorption refrigeration system according to claim 1 and to a apparatus therefor according to the preamble of claim 4.

In sorption refrigeration systems, specifically adsorption heat pumps or adsorption refrigeration machines, an adsorber unit is cyclically supplied, on the one hand, with a hot fluid, specifically hot water, for desorbing and expelling an adsorbate and, on the other hand, with a cold fluid for dissipating the generated adsorption heat, whereby a cooling agent, e.g. cooling water, flows substantially continuously through a condenser and a refrigerating fluid flows substantially continuously through an evaporator.

The supply of the adsorber unit is usually accomplished by means of controlled reversing valves. The valves are controlled by a control unit. According to the prior art a fixed time clock is, as a rule, predetermined for this purpose, so that adsorptions and desorptions are carried out in a defined time constant, which is preferably predeterminable, but fixed during the course of the process.

According to the prior art phases are, for this purpose, passed through in a cyclic process. In the first phase an adsorbate is adsorbed in the adsorber unit, and heat is dissipated. In a second phase a desorption takes place and the adsorbate is expelled, and heat is absorbed. In most cases, divided adsorber units are used, in which a first adsorber carries out an adsorption and a second adsorber carries out a desorption.

The refrigerating capacities obtainable during these processes and the efficiencies (COP) of the system are thereby correlated to the durations of the sorption phases. Short sorption durations imply that the adsorptions and desorptions are tendentially carried out incompletely. This entails a high refrigerating capacity, but a reduced system efficiency (COP).

Prolonged phase durations entail a more complete adsorption and desorption. The refrigerating capacity is then smaller, while the system efficiency is increased. If the time constants for the respective phases are fixedly predetermined, which is common in the prior art, the sorption refrigeration system is fixed to a more or less efficient operating point. However, this operating point is rigid and cannot react on varying operating conditions, for example, a fluctuating cooling load. The selected operating point is then no longer in the optimum range, and the sorption refrigeration system works inefficiently.

Based on the foregoing it is the object of the invention to provide a method for controlling the capacity of a sorption refrigeration system, which allows an automatic and flexible adjustment of the operating point of the system to varying operating conditions, and by means of which particularly the refrigerating capacity and the system efficiency remain in an optimum corresponding to the operating conditions.

The solution to the object is achieved with a method for controlling the capacity of a sorption refrigeration system according to the teaching of claim 1 and a sorption refrigeration system according to the features of claim 4. The respective dependent claims each define useful and advantageous embodiments of the method and the apparatus.

According to the inventive method in connection with the aforementioned method steps the temperature of the refrigerant is measured in the return of the evaporator. In the sorption phase a calculation is made of an averaged refrigerant outlet temperature in combination with a comparison of the averaged refrigerant outlet temperature with a current refrigerant outlet temperature.

In order to terminate the sorption phase a control signal is triggered in response to the difference between the averaged refrigerant outlet temperature and the current refrigerant outlet temperature.

The method aims at optimizing the refrigerating capacity of the system by adjusting the duration of the adsorption process in response to the current outlet temperature of the refrigerant, whereby the circumstance is taken advantage of that the temperature of the refrigerant rises with the increasing duration of the adsorption process because it becomes ineffective as the duration increases. The averaged outlet temperature of the refrigerant here serves as reference value for the current outlet temperature of the refrigerant. The averaged outlet temperature is a device constant of the respectively used adsorber, which is obtained from the adsorption process currently taking place, or which can also be predetermined.

Preferably, the sorption phase in the adsorber unit is substantially terminated at a time when the difference between the averaged refrigerant outlet temperature and the current refrigerant outlet temperature disappears, that is, tends to zero.

At this point the current outlet temperature of the refrigerant corresponds to the averaged outlet temperature. Using such an approach the circumstance is taken advantage of that, during different courses of individual sorption phases, the current outlet temperatures of the refrigerant fluctuate around the averaged outlet temperature. The point of intersection of both time dependences then marks a time as of which the adsorption currently taking place loses effectiveness. If the adsorption process is now terminated at this time, the refrigerating capacity obtainable in the adsorption phase currently taking place is maximized.

In one embodiment of the method, the averaged refrigerant outlet temperature may be predetermined as a set value for the refrigerant temperature. In connection with the aforementioned method steps the duration of the first and third phase inside the system can now be specified by predetermining this set value.

The course of the adsorption phases inside the system is thus no longer determined by the predetermination of durations of the individual phases, which durations are not causally relevant for the refrigerating capacity, but by an operating parameter in the form of a temperature, which describes the action of the system more definitely and to which, as described before, the system adjusts itself automatically.

A sorption refrigeration system comprises an adsorber device, a condenser and an evaporator flown through by a refrigerating fluid and having a valve means for the controlled supply of the adsorber device. According to the invention a temperature measuring device is provided in the return of the evaporator. This temperature measuring device is connected to a control unit which comprises a computing element for determining a refrigerant outlet temperature averaged during at least one adsorption phase and a comparing element for comparing the averaged refrigerant outlet temperature with a current refrigerant outlet temperature. Moreover, an actuator is provided for controlling the valve means in response to the difference between the averaged refrigerant outlet temperature and a current refrigerant outlet temperature.

Usefully, the adsorber device is comprised of an alternately supplyable assembly of a first adsorber and a second adsorber.

In connection therewith there are provided a first valve means controlling the forward flow to both adsorbers and a second valve means controlling the return flow from both adsorbers.

The first and/or the second valve means is/are comprised of an assembly of three-way reversing valves each switched in pairs. In one embodiment the refrigerating fluid is water.

The method according to the invention and the sorption refrigeration machine according to the invention will be described in more detail below by means of exemplary embodiments. Like reference numbers will be used for identical parts or identically acting parts. The accompanying FIGS. 1 to 6 serve illustration purposes.

Figure 1:
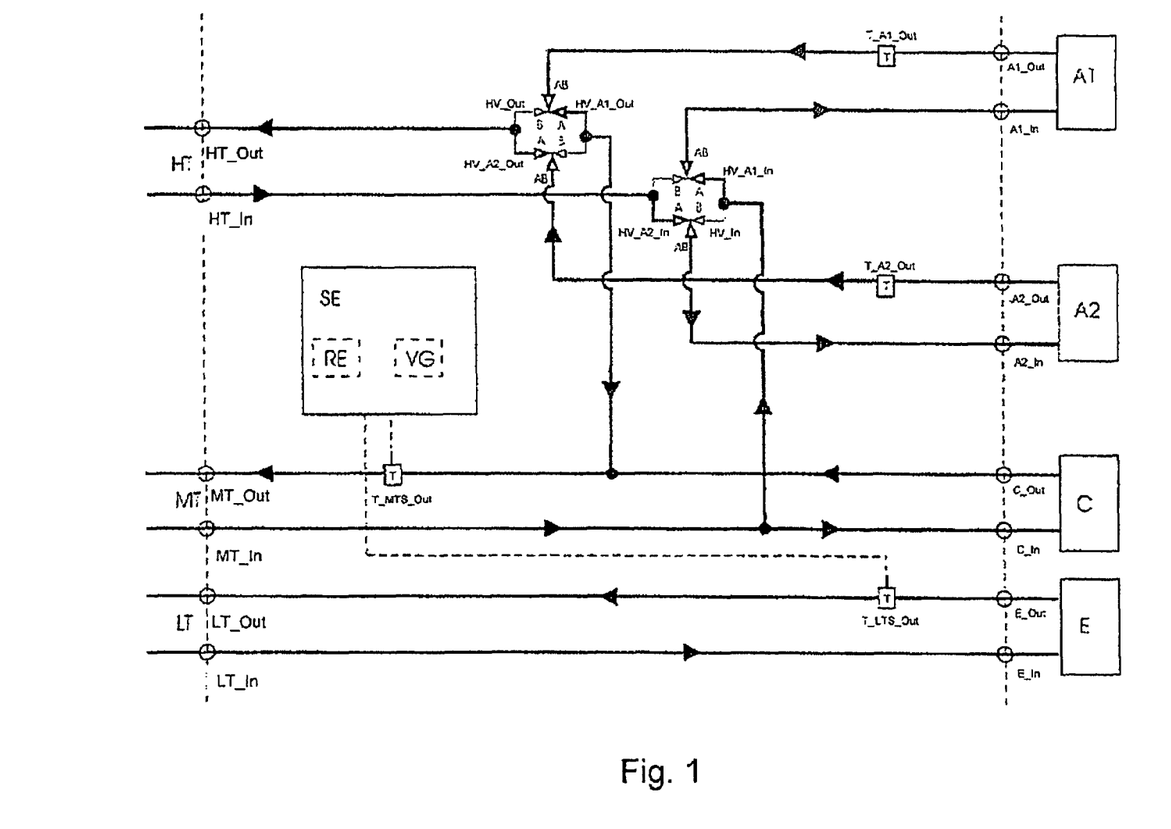
FIG. 1 shows an exemplary hydraulic circuit diagram in the first sorption phase.

FIG. 1 shows a hydraulic circuit diagram of an exemplary sorption refrigeration system. In this circuit diagram the flows during the first sorption phase are emphasized. The sorption refrigeration system comprises a heat reservoir HT, a cooling agent reservoir MT, and a refrigerant reservoir LT. The heat reservoir contains a heating medium for desorbing and expelling an adsorbate. In the following embodiments hot water will be assumed as heating medium.

The cooling agent reservoir contains a fluid for dissipating the adsorption heat. In the following embodiments water will be assumed as cooling agent.

The refrigerant reservoir contains a fluid from which heat is withdrawn in an evaporator E. In the following embodiments the refrigerant is cold water. The refrigerant circuit consists of a refrigerant flow pipe extending between an outlet LT_IN of the refrigerant reservoir LT and an inlet E_IN of the evaporator E, and a refrigerant return pipe extending between an outlet E_OUT of the evaporator and a return LT_OUT of the refrigerant reservoir LT.

As adsorber device a two-part assembly of alternately supplied and push-pull-operated adsorbers A1 and A2 is provided.

Into the refrigerant return pipe a refrigerant return flow sensor T_LTS_OUT is connected, which measures the temperature of the refrigerant in the return of the evaporator E.

A cooling agent flow pipe extends between an outlet MT_IN and an inlet C_IN of a condenser C. This cooling agent flow pipe is connected with a cooling agent return pipe extending between an outlet C_OUT of the condenser C and a return MT_OUT of the cooling agent reservoir to form a cooling agent circuit. Into the cooling agent return pipe a cooling agent return flow sensor T_MTS_OUT is connected, which measures the temperature of the cooling agent in the condenser return.

A control unit SE records the temperature signals of the refrigerant return flow sensor T_LTS_OUT and controls the operation of the valve means described below.

There are provided two valve means for controlling the sorption refrigeration system. A first valve means HV_IN controls the forward flow of the first adsorber A1 and the second adsorber A2 with the hot water from the heat reservoir HT and with the cooling water from the cooling agent reservoir MT, a second valve means HV_OUT controls the return flow of the two adsorbers. Each valve means comprises three-way valves as switching actuators, which are switched by the control unit.

The valve means HV_IN is formed of a first three-way valve HV_A1_IN which controls the supply to adsorber A1. A central connection AB of the three-way valve HV_A1_IN is coupled to an inlet MIN of the adsorber A1. A wing A of this three-way valve leads into the cooling agent flow pipe of the cooling agent circuit, a wing B is connected to an outlet HT_IN of the heat reservoir HT.

The forward flow of the adsorber A2 is controlled by a second three-way valve HV_A2_IN which is disposed in valve means HV_IN. The central connection AB of this three-way valve is connected to the inlet A2_IN of the adsorber A2, the wing A is connected to the outlet HT-IN of the heat reservoir HT, the wing B is coupled to the cooling agent flow pipe.

A second valve means HV_OUT controls the return flow of the first adsorber A1 and the second adsorber A2 to the heat reservoir HT and the cooling agent reservoir MT. The valve means HV_OUT is formed of a first three-way valve HV_A1_OUT for controlling the return flow from the adsorber A1. A central connection AB of this three-way valve is coupled to the outlet A1_OUT of the adsorber A1. A wing A of the three-way valve leads into the cooling agent return pipe extending between a condenser C and the cooling water reservoir MT. A wing B is connected to a return HT_OUT of the heat reservoir HT.

A second three-way valve HV_A2_OUT controls the return flow of the adsorber A2. The central connection AB of this three-way valve is connected to the outlet A2_OUT of the adsorber A2. The wing A of this three-way valve is coupled to the return HT_OUT of the heat reservoir HT. The wing B leads into the cooling agent return pipe extending between the condenser C and the cooling agent reservoir MT.

The adsorbers each carry out adsorptions and desorptions in a push-pull operation. In the first sorption phase shown in FIG. 1 the valve means are switched in such a way that an adsorption is carried out in adsorber A1 and a desorption is carried out in adsorber A2. Via valve HV_A1_IN, in particular via the opened wing A thereof and the central piece AB, the adsorber A1 is supplied with cooling agent from the cooling agent flow pipe. The cooling agent flows via the valve HV_A1_OUT, in particular via the central piece and wing A thereof, into the cooling agent return pipe, and flows back to the cooling agent reservoir MT.

In order to carry out the desorption the adsorber A2 is supplied with hot water from the heat reservoir HT via valve HV_A2_IN, in particular via wing A and central piece AB thereof. The hot water then flows back into the heat reservoir HT via valve HV_A2_OUT, in particular via wing A and central piece AB thereof.

Figure 1A:
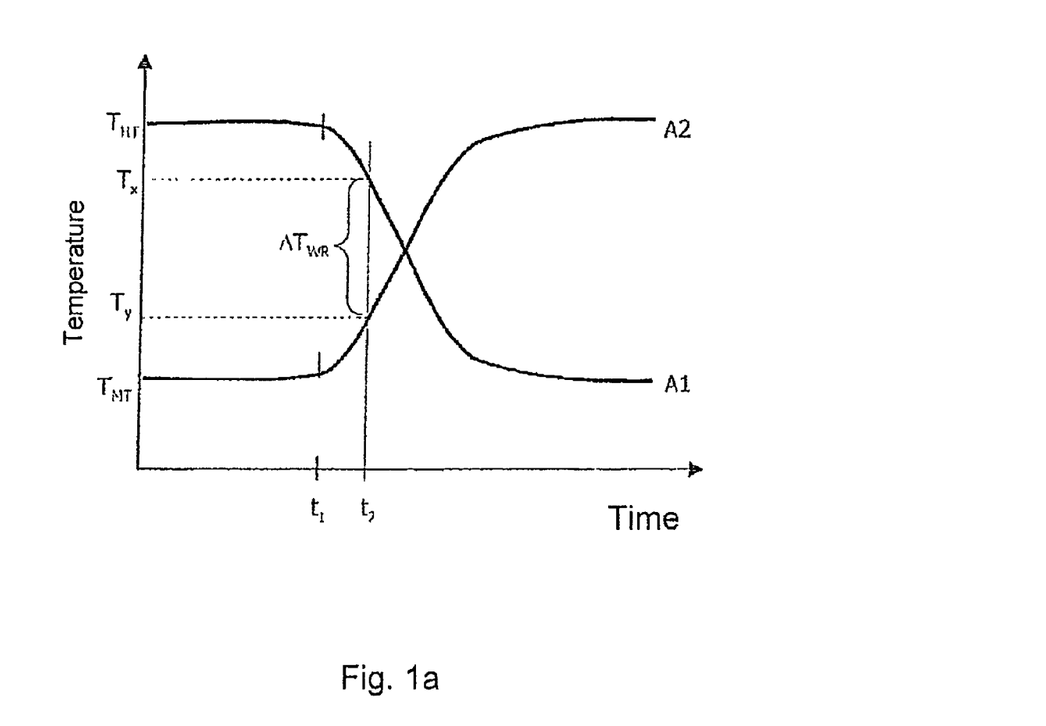
FIG. 1a shows an exemplary temperature profile during a heat recovery phase.

In the subsequent heat recovery phase now a heat transfer from adsorber A1 to adsorber A2 takes place. FIG. 1a shows an ensuing exemplary time-dependent temperature profile in the adsorbers A1 and A2. Time $t_1$ here denotes the beginning of the heat recovery phase, $t_2$ the end thereof.

The heat recovery is exclusively accomplished by a specific combination of the valve positions, so that no additional pump is required for transporting the heat transfer fluid having the higher temperature from adsorber A1 to adsorber A2.

The valve HV_A1_IN is rather switched in the flow direction between connections A and AB, and valve HV_A1_OUT is switched in the flow direction between connections AB and A. The valve HV_A2_IN is correspondingly switched in flow direction between connections A and AB, and valve HV_A2_OUT is switched in flow direction between connections AB and B.

With these valve positions the cold recooling fluid flows from the cooling agent reservoir MT into the adsorber A1 to be cooled, while it does not flow back into the cooling agent reservoir MT immediately, but is first conducted into the return of the heat reservoir HT. This takes place until a defined temperature $T_x$ in the recooling fluid is reached. At the same time, the currently cold adsorber A2 is connected to the flow pipe of the heat reservoir HT, while the initially still cold return flow from adsorber A2 is heated and, until a temperature $T_y$ is reached, is conducted into the return of the cooling agent reservoir MT.

The heat recovery phase is then terminated at time $t_2$ when the temperature difference between temperatures $T_x$ and $T_y$ has reached a predetermined value $\Delta T_{WR}$. Then, a second sorption phase is initiated.

Figure 2:
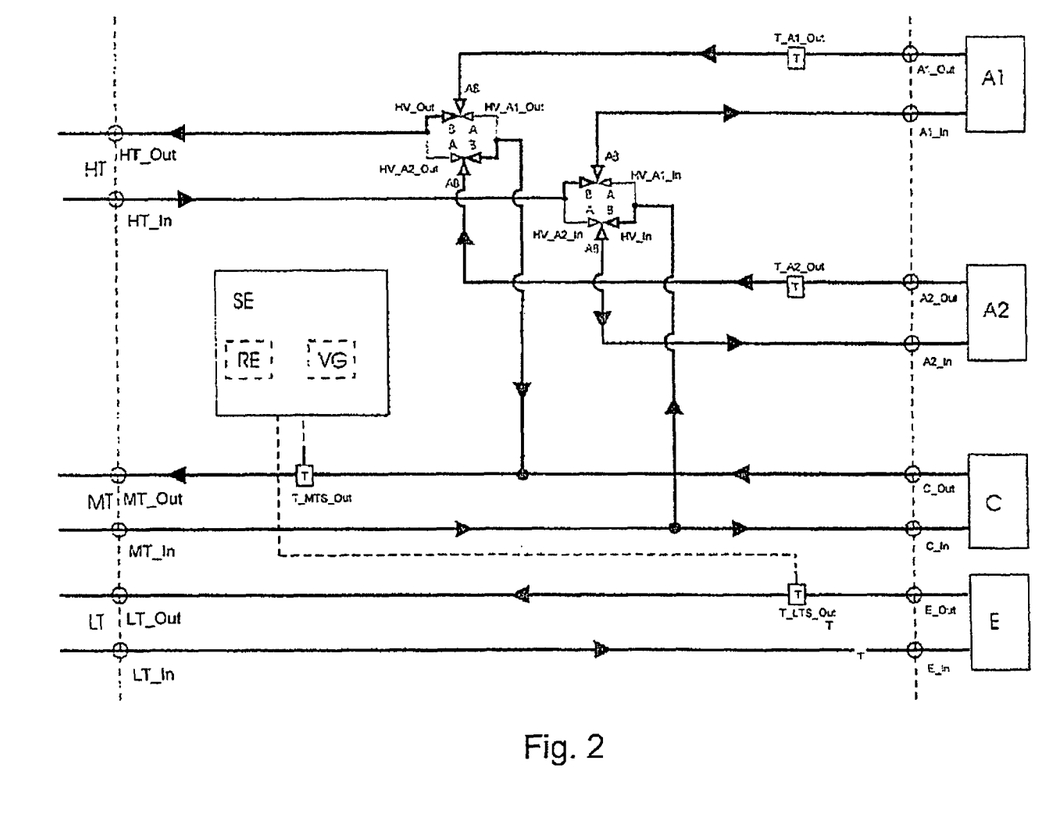
FIG. 2 shows a hydraulic circuit diagram in the second sorption phase.

In the second sorption phase the valve means are switched in the fashion shown in FIG. 2. A desorption is now carried out in adsorber A1. The three-way valve HV_A1_IN is now switched in such a way that the inlet A1_IN of adsorber A1 is supplied with hot water via wing B and central piece AB thereof. Correspondingly, the three-way valve HV_A1_OUT is switched in such a way that a return flow from outlet A1_OUT of the adsorber A1 to the heat reservoir HT takes place.

Via valve HV_A2_IN, in particular via the opened wing B and the central piece AB thereof, the adsorber A2 is supplied with cooling agent from the cooling agent flow pipe. The cooling agent flows via the valve HV_A2-OUT, in particular via the central piece AB and the wing B thereof, into the cooling agent return pipe, and flows back again to the cooling agent reservoir MT. Thus, a desorption is carried out in the adsorber A2.

In a subsequent heat recovery phase the valves are switched in such a way that a heat recovery takes place from the adsorber A2 to the adsorber A1. The information already given in connection with FIG. 1a now have to be interpreted correspondingly.

During the sorption phases the control unit SE records by means of temperature sensor T_LTS_OUT the temperature of the refrigerant in the return of the evaporator E and operates the valve means HV_IN and HV_OUT in response to the measured temperature profile.

Figure 3:
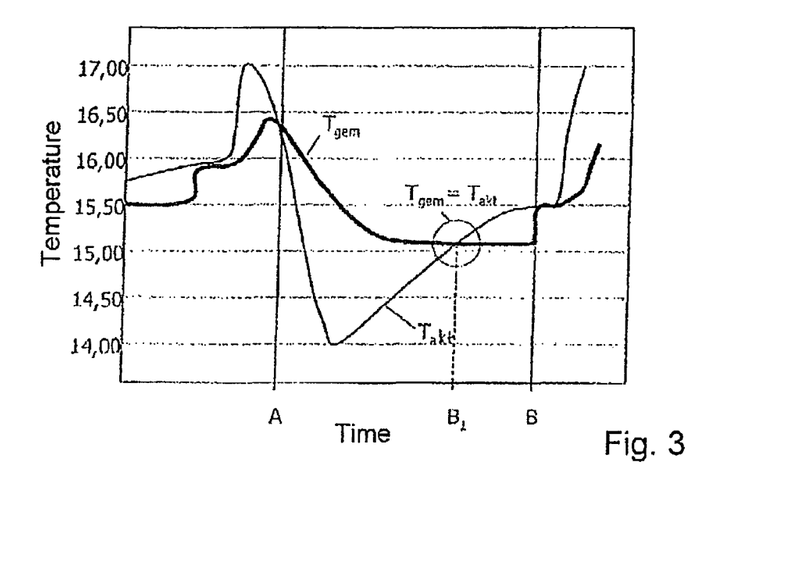
FIGS. 3 to 5 show diagrams illustrating typical time dependences of the averaged and current refrigerant outlet temperature.

This is illustrated in the diagram according to FIG. 3, which shows a time-dependent temperature of the refrigerant. A time dependence of the current refrigerant temperature $T_{akt}$ is measured on the temperature sensor and is transmitted to the control unit. The control unit calculates in a computing unit RE contained in the same an averaged refrigerant temperature $T_{gem}$ and compares it in the comparing unit VG with the current temperature $T_{akt}$ of the refrigerant.

In the diagram, the beginning of a sorption phase is designated with reference number A, and the end of the sorption phase is designated with reference number B. The curve of the averaged temperature describes an average temperature profile in the refrigerant during a sorption phase, which is determined from a number of sorption cycles. As can be seen in the diagram, the time-dependent temperature of the refrigerant initially drops steeply and approximates a constant final value by the end of the sorption phase. At the switch off time B the temperature of the refrigerant jumps up again and approximates a temporary maximum value before a new sorption phase commences.

The time dependence of the temperature $T_{akt}$ of the refrigerant currently measured in an individual sorption phase may distinctly differ from the averaged temperature $T_{gem}$. In the example shown, the current temperature reaches a clearly higher maximum between the sorption phases and passes through a minimum clearly under the averaged temperature curve during the sorption phase. The current refrigerant temperature then continuously rises during the sorption phase, intersects the curve of the averaged temperature $T_{gem}$ at time $B_1$ and rises above the same until time B. This means that the refrigerating capacity drops between time $B_1$ and time B in the sorption phase.

According to the invention the sorption phase is now terminated at time $B_1$. To this end, the control unit compares continuously the current temperature of the refrigerant in the comparing element and outputs at time $B_1$ a control pulse to the valve means HV_IN and HV_OUT, i.e. to the three-way valves HV_A1_IN, HV_A2_IN, HV_A1_OUT and HV_A2_OUT contained therein, so that the sorption processes are terminated in at least one of the two adsorbers.

Figure 4:
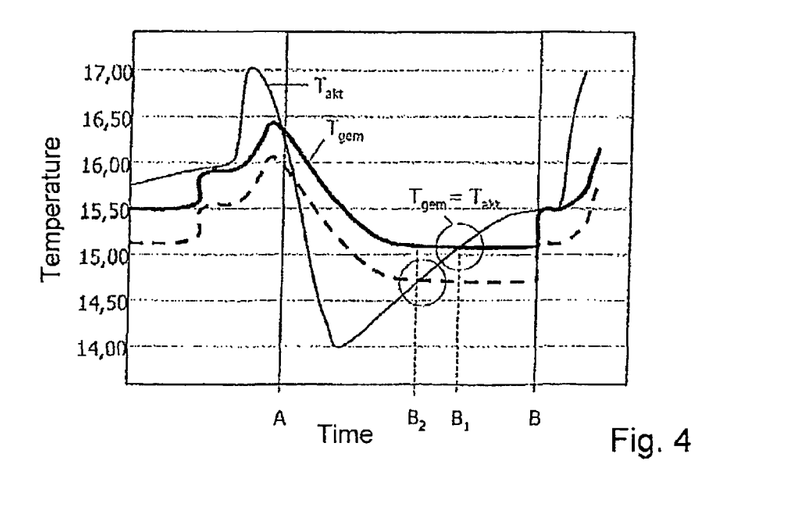

It can be seen in the diagram according to FIG. 4 that the time period defined by the interval between A and $B_1$ can be fixed by an appropriate predetermination of the averaged refrigerant temperature. A parallel displacement of the averaged temperature curve to lower temperatures shortens the time period of the sorption phase. The sorption phase then ends at a new time $B_2$. Thus, the system efficiency is reduced, while the obtainable refrigerating capacity is increased. A non-illustrated parallel displacement of the averaged temperature curve to higher temperatures correspondingly leads to an opposite effect.

Figure 5:
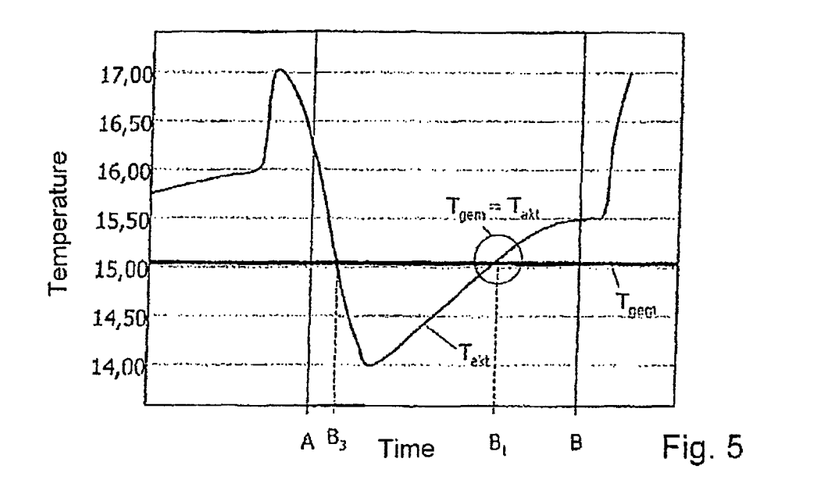

FIG. 5 shows an averaged temperature curve in the form of a simple threshold which is constant with respect to time. Such a temperature predetermination is the easiest to realize. Such a threshold basically allows two points of intersection between the curve of the current refrigerant temperature and the line of the threshold, which are designated with reference numbers $B_1$ and $B_3$ in the figure. To choose the correct point of intersection between both curves, i.e. the correct time for terminating the sorption phase, the sign of the difference in the term $T_{akt}$-$T_{gem}$ can be evaluated in the control unit.

Figure 6:
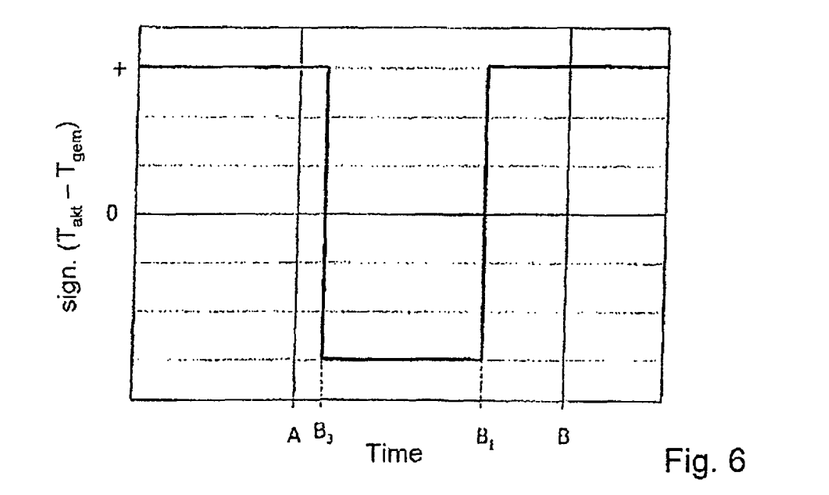
FIG. 6 shows a sign function according to FIG. 5.

FIG. 6 shows the sign function sign($T_{akt}$-$T_{gem}$) according to the curves of FIG. 5.

It can be seen that at time $B_3$ a sign jump from + to − takes place, while time B1 is characterized by a jump of the sign function from − to +. In a recording of the current refrigerant temperature, which is sufficiently close with respect to time, the sign change of the difference taking place at times $B_3$ and $B_1$ can be determined together with its direction more or less instantaneously, and the corresponding control pulses can be outputted to the valve means.

The approaches described above have a decisive advantage as compared to conventional systems. By knowing the averaged temperature of the refrigerant, and due to the control associated therewith, it is possible to adjust a maximum refrigerating capacity. Moreover, such a control allows the exact predetermination and observation of set values of the refrigerant temperature. If a set value is chosen correspondingly, the sorption phases are extended, so that the system efficiency is improved, while smaller refrigerating capacities are possible along with an all-in-all increased efficiency. The choice of the set value allows a refrigeration according to need.

The potential for the refrigeration of the sorption refrigeration system, which varies according to different use conditions, is taken into account in that, by means of controlling, with the aid of the once predetermined set value of the refrigerant temperature, the duration of the sorption phases and thus of the operating cycle of the system is controlled independently by the system itself. Thus it is achieved that, on the basis of the predetermined set value of the refrigerant temperature, the mode of operation is always optimized relative to the system efficiency, with the durations of the operating cycles being variably adapted.

Thus, by predetermining a fixed set value for the refrigerant temperature, it is also possible to ensure an optimum operation of the sorption refrigeration system even if the cooling locations, i.e. different types of refrigeration consumers, are configured differently. This applies above all to heat exchanger fan units, which are integrated in the refrigerant circuit, with a temperature of, for example, 12° C. at the outlet LT_IN of the refrigerant reservoir and 7° C. at the return LT_OUT of the refrigerant reservoir as compared to cooling ceiling arrangements applied to room walls, floors and ceilings, in which the temperature in the refrigerant circuit varies, for example, in a range of 18° C. and 15° C. between the outlet LT_IN and the return LT_OUT.

List of Reference Numbers
A1 first adsorber
A2 second adsorber
HT heat reservoir
HV_IN forward flow valve means
HV_A1_IN three-way valve for adsorber 1
HV_A2_IN three-way valve for adsorber 2
HV_OUT return flow valve means
HV_A1_OUT three-way valve for adsorber 1
HV_A2_OUT three-way valve for adsorber 2
MT cooling agent reservoir
MT_IN outlet
MT_OUT return
LT refrigerant reservoir
LT_IN outlet
LT_OUT return
E evaporator
E_IN evaporator input
E_OUT evaporator outlet
C condenser
C_IN inlet
C_OUT outlet
SE control unit
T_LTS_OUT refrigerant return flow sensor
T_MTS_OUT cooling agent return flow sensor

The invention claimed is:

1. Method for controlling the capacity of a sorption refrigeration system, comprising an adsorber unit (A1, A2), a condenser (C) and an evaporator (E) through which flows a refrigerant, with an alternate supply of the adsorber unit by a valve means (HV_IN, HV_OUT) operated by a control unit, and with a cyclic process of at least one sorption phase and at least one heat recovery phase, the evaporator having a refrigerant return in which flows the refrigerant in a flow direction away from the evaporator, the method comprising the steps of:
   measuring a current refrigerant outlet temperature ($T_{akt}$) in the refrigerant return of the evaporator,
   calculating an averaged refrigerant outlet temperature ($T_{gem}$) and comparing the averaged refrigerant outlet temperature with the current refrigerant outlet temperature ($T_{akt}$) during the first and second sorption phase and determining the difference therebetween, and
   triggering a control signal provided to the valve means so as to terminate the sorption phase in response to the difference between the averaged refrigerant outlet temperature ($T_{gem}$) and the current refrigerant outlet temperature ($T_{akt}$).

2. Method according to claim 1, which further comprises the step of:
   substantially terminating the sorption phase in the adsorber unit at a time when the difference between the averaged refrigerant outlet temperature ($T_{gem}$) and the current refrigerant outlet temperature ($T_{akt}$) disappears.

3. Method according to claim 1, which further comprises the step of:
   predetermining the averaged refrigerant outlet temperature ($T_{gem}$) as a set value for the refrigerant temperature ($T_{soll}$) and determining the duration of the sorption phase by the adjustment of the set value for the refrigerant temperature.

4. Sorption refrigeration apparatus, comprising an adsorber device, a condenser (C) and an evaporator (E) through which flows a refrigerant and having a valve means (HV_IN, HV_OUT) controlling fluid supply of the adsorber device, the evaporator having a refrigerant return through which flows the refrigerant in a flow direction away from the evaporator, which comprises:
   a temperature measuring device provided in the refrigerant return of the evaporator, the temperature measuring device including a refrigerant return flow sensor (T_LTS_OUT), a control unit (SE) comprising a computing element (RE) which determines a refrigerant outlet temperature averaged during at least one adsorption phase, and a comparing element (VG) which compares the averaged refrigerant outlet temperature with a current refrigerant outlet temperature, and an actuator operated by the control unit which controls the valve means in response to the difference between the averaged refrigerant outlet temperature and the current refrigerant outlet temperature.

5. Apparatus according to claim 4, wherein
the adsorber device is comprised of an alternately suppliable assembly having a first adsorber (A1) and a second adsorber (A2).

6. Apparatus according to claim 4, wherein the value means includes
a first valve means (HV_IN) controlling the forward flow to both adsorbers and a second valve means (HV_OUT) controlling the return flow from the two adsorbers.

7. Apparatus according to claim 4, characterized in that
at least one of the first valve means and the second valve means includes an assembly having three-way reversing valves (HV_A1_IN, HV_A2_IN, HV_A1_OUT, HV_A2_OUT), the reversing valves being switched in pairs as switching actuators.

8. Apparatus according to claim 4, wherein
the refrigerant is water.

9. Method according to claim 2, which further comprises steps of:
   predetermining the averaged refrigerant outlet temperature ($T_{gem}$) as a set value for the refrigerant temperature ($T_{soll}$) and determining the duration of the sorption phase by the adjustment of the set value for the refrigerant temperature.

10. Apparatus according to claim 5, wherein the value means includes
a first valve means (HV_IN) controlling the forward flow to both adsorbers and a second valve means (HV_OUT) controlling the return flow from the two adsorbers.

11. Apparatus according to claim 5, wherein
the refrigerant is water.

* * * * *